United States Patent [19]
Chioffe

[11] Patent Number: 4,732,439
[45] Date of Patent: Mar. 22, 1988

[54] KIT ASSEMBLY FOR TRANSFORMING A CONTAINER INTO A KALEIDOSCOPE

[76] Inventor: Joseph J. Chioffe, 811 Beckman Dr., North Bellmore, N.Y. 11710

[21] Appl. No.: 19,964

[22] Filed: Feb. 27, 1987

[51] Int. Cl.$^4$ .............................................. G02B 23/00
[52] U.S. Cl. ..................................................... 350/4.1
[58] Field of Search .................................. 350/4.1, 4.2

[56] References Cited

U.S. PATENT DOCUMENTS

| | | | |
|---|---|---|---|
| 1,398,858 | 11/1921 | House | 350/4.1 |
| 2,447,623 | 8/1948 | Zemelman | 350/4.2 |
| 2,454,577 | 11/1948 | Smith | 350/4.1 |
| 2,991,689 | 7/1961 | Taylor | 350/4.2 |
| 3,096,681 | 7/1963 | Burnside, III | 350/4.1 |
| 3,122,859 | 3/1964 | La Reaux, Jr. | 350/4.1 |
| 3,131,593 | 5/1964 | Grow | 350/4.1 |
| 3,160,056 | 12/1964 | Taylor | 350/4.1 |
| 4,040,716 | 8/1977 | Matsubara | 350/4.1 |
| 4,494,820 | 1/1985 | Klawitter | 350/4.1 |

*Primary Examiner*—Richard A. Wintercorn
*Attorney, Agent, or Firm*—Lilling & Greenspan

[57] ABSTRACT

A kit assembly for transforming a container into a kaleidoscope consisting of a hand supportable container which has an open first end and a second end having a viewing hole. A reflecting means is inserted into the container between the first end and the viewing hole. A picture or decal adhered to a rotatable means is placed over the first end of the container and is viewed through the viewing hole and the reflecting means. An image of the picture is defined by a reflecting surface of the reflecting means at the viewing hole so that, when the rotatable means is turned, a viewer sees a varying composite image of the picture.

10 Claims, 4 Drawing Figures

KIT ASSEMBLY FOR TRANSFORMING A CONTAINER INTO A KALEIDOSCOPE

BACKGROUND OF THE INVENTION

The present invention relates to a novel kit assembly for transforming a container, such as a drinking cup, into a kaleidoscope.

Kaleidoscopes have been long time favorite toys for children as they offer both an entertaining visual toy and may serve as one of the first means of piquing a child's interest in the science of optics.

Most kaleidoscopes known in the art are relatively complex in design and expensive in construction. Further, the kaleidoscopes are generally singular in purpose and cannot be adopted for other uses.

The void for a simple and inexpensive kaleidoscope has been filled by the subject invention. The assembly kit consists of a rectangular sheet having a reflecting surface which is folded lengthwise and dropped into a drinking container and used to view a rotating picture or decal attached to the open end of the container. At a relatively inexpensive cost, a utility item is thus turned into a play toy which can add hours of fun and enjoyment for children of all ages. Further, the kit assembly may be used to promote the sale of commodities or liquids which may be placed in containers suitable to be transformed into a kaleidoscope.

SUMMARY OF THE INVENTION

The novelty of this inventive kit assembly consists of a reflecting means which is inserted into a container to transform a utility device into a play toy. The container has an open first end and a second end with a viewing hole. A rotatable means for holding a picture or a plurality of pictures is attached to the open first end and viewed through the reflecting means and viewing hole by the child. As the child turns the rotatable means, a kaleidoscope image is defined by the reflecting means at the viewing hole.

DETAILED DESCRIPTION OF THE DRAWINGS

Figure 1:
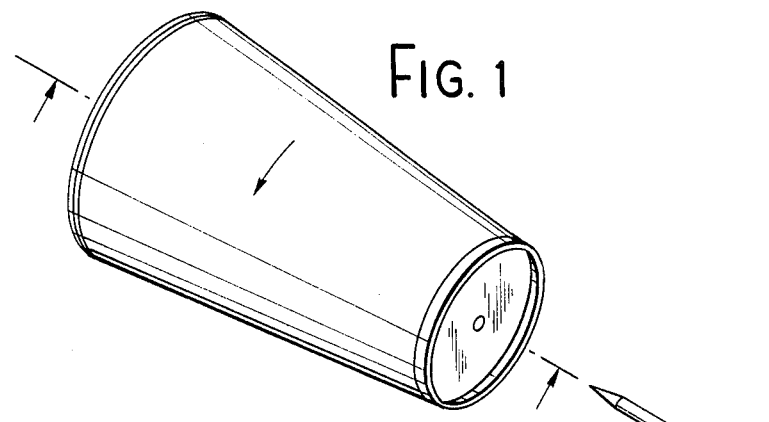
FIG. 1 is a prespective view of a container housing the kit assembly.

The inventive kit assembly 1 may be used with any suitable container design which may house the invention. In the preferred embodiment, a wax coated paper soft drink cup 2 is used as shown in FIG. 1. A paper drinking cup is preferred because of the ease of making a viewing hole 3 through its bottom side 4.

The viewing hole 3 may be of any size or shape desired, however, the easiest method of making such a hole 3 is by using a sharp utencil, such as a pencil 5 or pen. A pencil 5 or writing instrument is commonly available and it is presumed that a soft drink ordered from a take-out establishment would most likely come in a paper cup. Therefore, a child would not be lacking in a method of making a viewing hole 3 in the bottom 4 of his emptied paper cup 2 as writing instruments are usually available.

Other items which can be used to make the viewing hole 3 include a knife, an ice pick, a sharp twig, etc. The diameter 6 of the viewing hole 3 may be of any width desired, however, the diameter 6 should not be so large that the child's field of vision is not restricted along a reflecting surface 7 of a reflecting means 8 inserted in the drinking cup 2. Thus, the preferred diameter 6 of the viewing hole 3 is slightly larger than that of a pencil 5.

It may be appreciated that any container which will house the kit assembly 1 may be used as, for example, a candy box, popcorn box, etc. Further, the container may be made of any suitable material such as plastic, metal, or paper as described above. A limitation of the container or housing is the ability by the child to easily make a viewing hole 3 in its bottom side 4.

A second element of the kit assembly 1 consists of a rotatable means 9 placed at the open top end 10 of the cup 2 and having a picture or a plurality of pictures 11 attached to it. A plastic lid 12 used to contain liquids in most soft drink drinking cups 2 is preferred to function as the rotatable means 9, as plastic lids 12 are generally made with lips 13 which secure the lid 12 to the top end 10 of the cup 2. Once secured, the lid 12, may be rotated in either a clockwise or counterclockwise direction.

The lip provides a surface or platform on which a picture 11 or decal 11' may be viewed. Thus, a decal 11' may be pealed off its holding paper and placed on the inside surface 17 of the lid 12 in order to be viewed through the viewing hole 3.

A hand-held rotating device with a picture adhered to its inner surface may be used just as effectively as a rotating means 9 over the open end 10 of the drinking cup 2.

Figure 3:
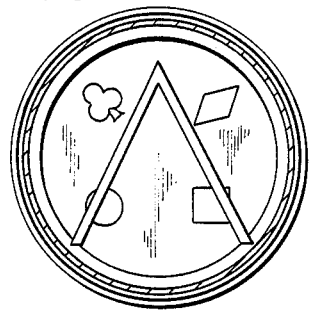
FIG. 3 is a cross-sectional view taken along lines 3—3 of FIG. 2.
Figure 4:
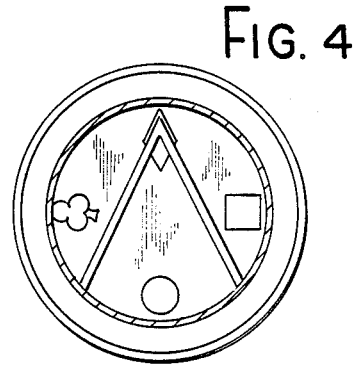
FIG. 4 is a cross-sectional view taken along lines 4—4 of FIG. 2.

A picture or pictures used on the decal 11' may be of any design desired. In particular, a child may wish to adhere pictures of his favorite supernatural heros or cartoon characters on the rotating means 9. Further, educational pictures may be used to comprise a composite which will vary as the rotatable means 9 is turned. Promotional figures of an establishment using the kit assembly 1 to promote the commodities held in its container may also be used and viewed by the child. Some examples of picture composites are shown in FIGS. 3 and 4. From an initial position as shown in FIG. 3, the pictures 11 adhered to the lid 12 are rotated in a counterclockwise direction to a second position as illustrated in FIG. 4.

Figure 2:
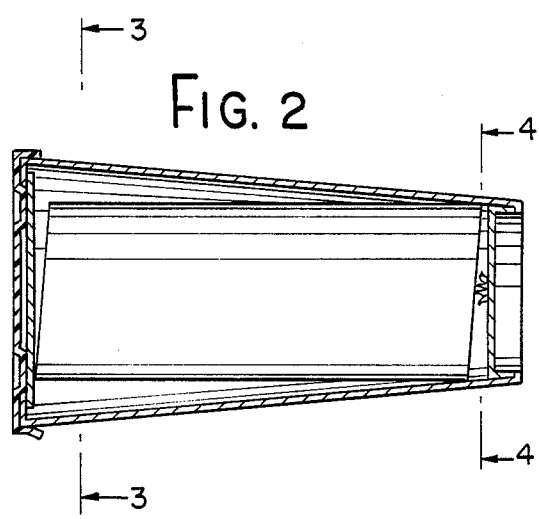
FIG. 2 is a cross-sectional view taken along lines 2—2 of FIG. 1.

Between the rotatable means 9 and the viewing hole 3 is a reflecting means 8 inserted into the drinking cup 2. In the preferred embodiment, the reflecting means 8 is made of a stiff paper sheet 18 cut into a rectangular shape. The edges 20, 21 along the shorter or width ends of the rectangular sheet 19 are cut at a slant so, when the sheet 19 is folded along its lengthwise axis 22, the slanted edges 20, 21 measure as acute angles. The preferred measurement of this angle is 80° from the Y-axis of an imaginary graph. Thus, when the folded reflecting means 18 is inserted into the drinking cup 2, one corner 23 of the top slanted edge 20 abuts against the rotating means 9 as illustrated in FIG. 2.

In this position, the reflecting means 8 will be held in its initial position until the rotating means 9 is turned a certain arcuate distance past the point where the corner 23 abuts against the rotating means 9. At this point in the rotation of the rotating means 9, the reflecting means 8 no longer abuts against the rotating means 8 and falls to a second position within the container cup 2. In the second position the reflecting means 8 is again abutted against the rotating means 9 and held in its second position for a similar amount of time as the time it was held in the initial position. This construction design permits the reflecting means 8 to be held in position for a time while the pictures 11 are rotated with the lid 12. Thus, a child views the picture or pictures 11 of the rotating means 9 as a varying composite image without the interference of a moving reflecting means 8 and further without the need for an additional adhesive device for holding the reflector means 8 securely in place in the cup 2.

The reflecting means 8 may be made of any stiff material, preferably, cardboard, construction paper, etc. Adhered to one surface 19 of the reflecting means 8 is a reflecting material surface 7, such as chromed mylar aluminum foil, aluminum vacuumed onto a sheet, a reflecting metal, a mirror-like material, or any other suitable material known in the art. Further, it is preferred that the reflecting material be pliable enough to be bent when the user creases the reflecting means 8 to insert it into a container. Such a material is preferred to avoid a higher cost of manufacturing and packaging required for a pre-formed folded reflecting means 8.

The reflecting means 8 is folded along its lengthwise axis 22 so that one side 24 of the reflecting surface 7 is presented to face the other side 25. When folded as described, the reflecting means 8 defines a triangular field of vision from the viewing hole 3 to the rotating means 9 with the reflecting surfaces 7 defining sides of the traingle. When positioned in the cup 2, the reflecting surfaces 7 of the reflecting means 8 define an image of the pictures 11 attached to the rotating means 9 at the viewing hole 3.

I claim:

1. A kit assembly for transforming a container into a kaleidoscope comprising:
    (a) a hand supportable container having an open first end and a second end with a viewing hole;
    (b) a reflecting means located lengthwise in said container between said first end and said second end for producing varying images at said viewing hole, said reflection means comprising a rectangularly shaped sheet having a reflecting material adhered to one side of said sheet, and said sheet folded along a lenghtwise axis and having one side of the reflecting surface facing a second side of the reflecting surface; and
    (c) a rotatable means for holding at least one picture adjacent to said first end of said container in front of said reflecting means.

2. A kit assembly according to claim 1, wherein said reflecting means further comprises a top edge slanted toward said rotatable means when said rectangular sheet is folded along said lengthwise axis and having one corner of said top edge abutting against said rotatable means.

3. A kit assembly according to claim 2, wherein said slanted top edge measures 80° from a Y-axis of an imaginary graph.

4. A kit assembly according to claim 3, wherein said reflecting material comprises an element from the group consisting of chromed mylar aluminum, metal and mirror material.

5. A kit assembly according to claim 4, wherein said rotatable means comprises said picture adhered to an inner surface of a lid placed over said first end of said container.

6. A kit assembly according to claim 5, wherein said lid is made of plastic.

7. A kit assembly according to claim 6, wherein said picture comprises at least one decal having an adhesive on a back surface of said decal.

8. A kit assembly for transforming a drinking cup into a kaleidoscope comprising:
    (a) a drinking cup convertible to a hand supportable housing having an open first end and a second end in which a viewing hole can be made;
    (b) a pre-cut rectangular sheet having a reflecting surface attached to one side of said sheet inserted lengthwise into said housing between said first end and said second end and defining varying images at said viewing hole;
    (c) a lid placed over said open first end of said drinking cup; and
    (d) at least one picture rotatably attached to an inside surface of said lid viewed through said viewing hole in side second end.

9. A kit assembly according to claim 8, wherein said drinking cup is made of a paper material.

10. A method of transforming a container into a kaleidoscope comprising:
    (a) making a hole in a bottom side of the container to use as a viewing hole;
    (b) folding a reflecting means having a reflecting surface along a lengthwise axis to present one side of said reflecting surface facing a second side of said reflecting surface;
    (c) inserting said reflecting means into said container;
    (d) adhering at least one picture to a lid covering an open end of said container;
    (e) attaching said lid to said open end of said container; and
    (f) rotating said lid while holding said container in a stationary position and viewing said picture through said viewing hole.

* * * * *